(12) United States Patent
Axnäs et al.

(10) Patent No.: US 9,647,930 B2
(45) Date of Patent: May 9, 2017

(54) ROUTE DETERMINATION IN A MULTI-HOP NETWORK USING MULTIPLE ROUTING METRICS

(71) Applicant: Telefonaktiebolaget L M Ericsson (publ), Stockholm (SE)

(72) Inventors: Johan Axnäs, Solna (SE); Kumar Balachandran, Pleasanton, CA (US); Robert Baldemair, Solna (SE); Dennis Hui, Sunnyvale, CA (US); Hugo Tullberg, Nyköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 14 days.

(21) Appl. No.: 14/646,447

(22) PCT Filed: Nov. 26, 2012

(86) PCT No.: PCT/SE2012/051302
§ 371 (c)(1),
(2) Date: May 21, 2015

(87) PCT Pub. No.: WO2014/081364
PCT Pub. Date: May 30, 2014

(65) Prior Publication Data
US 2015/0304207 A1  Oct. 22, 2015

(51) Int. Cl.
*H04W 40/02* (2009.01)
*H04L 12/721* (2013.01)
*H04L 12/26* (2006.01)

(52) U.S. Cl.
CPC .......... *H04L 45/124* (2013.01); *H04L 43/045* (2013.01); *H04W 40/02* (2013.01); *Y02B 60/50* (2013.01)

(58) Field of Classification Search
CPC ................ H04L 65/00; H04L 45/00
See application file for complete search history.

(56) References Cited

U.S. PATENT DOCUMENTS 6,289,096 B1 * 9/2001 Suzuki ............... H04M 15/00
379/114.02
6,477,582 B1   11/2002 Luo et al.
(Continued)

OTHER PUBLICATIONS

"QoS-based multi-domain routing under multiple QoS metrics" by Derya Yiltas and Harry Perros; Computer Science Department, NC State University, 2011.
(Continued)

*Primary Examiner* — Andrew Lai
*Assistant Examiner* — Zhiren Qin
(74) *Attorney, Agent, or Firm* — Baker Botts, LLP

(57) ABSTRACT

The proposed technology provides a computationally efficient way to find suitable routes under consideration of multiple metrics. The considered multi-hop network is represented by a connected graph having nodes and links interconnecting the nodes. The method comprises the step (S1) of obtaining a value of a reference route between a source node and a destination node in the connected graph according a first routing metric. The method further comprises the step (S2) of modifying, based on the value of the reference route according to the first routing metric, the connected graph by modifying link cost, with respect to a second routing metric, of at least one link in the connected graph. The method also comprises the step (S3) of determining at least part of a route between the source node and the destination node in the modified connected graph, based on the modified link cost, according to the second routing metric.

23 Claims, 12 Drawing Sheets

(56) References Cited

U.S. PATENT DOCUMENTS

| | | | | |
|---|---|---|---|---|
| 2003/0117966 | A1* | 6/2003 | Chen | H04L 45/02 370/255 |
| 2004/0042473 | A1 | 3/2004 | Park et al. | |
| 2005/0286424 | A1* | 12/2005 | Peeters | H04B 3/462 370/235 |
| 2006/0268727 | A1* | 11/2006 | Rangarajan | H04L 45/00 370/248 |
| 2007/0180124 | A1* | 8/2007 | Mallesan | H04L 45/02 709/227 |
| 2008/0008272 | A1* | 1/2008 | Yang | H03M 13/2933 375/341 |
| 2008/0117829 | A1* | 5/2008 | Nakano | H04L 12/2697 370/247 |
| 2008/0144628 | A1* | 6/2008 | Tsai | H04L 1/0054 370/392 |
| 2009/0116393 | A1 | 5/2009 | Hughes et al. | |
| 2010/0278102 | A1* | 11/2010 | Lee | H04L 45/302 370/328 |
| 2011/0170416 | A1 | 7/2011 | Schwager et al. | |
| 2012/0123678 | A1* | 5/2012 | Poppen | G01C 21/3476 701/468 |
| 2012/0203459 | A1* | 8/2012 | Spindler | G01C 21/32 701/533 |

OTHER PUBLICATIONS

"Using Multiple Metrics with the Optimized Link State Routing Protocol for Wireless Mesh Networks" by Moreira Jr. et al, 2008.
"Quality-of-Service Routing for Supporting Multimedia Applications" by Zheng Wang and Jon Crowcroft; IEEE Journal on Selected Areas in Communications, vol. 14, No. 7, Sep. 1996.
"Routing Traffic with Quality-of-Service Guarantees in Integrated Services Networks" by Qingming Ma and Peter Steenkiste (8th International Workshop on Network and Operating Systems Support for Digital Audio and Video), Jul. 1998.
"Network Routing with Path Vector Protocols: Theory and Applications" by Joao Luis Sobrinho, Aug. 2003.
"On the Extended Bellman—Ford Algorithm to Solve Two—Constrained Quality of Service Routing Problems" by Xin Yuan, Department of Computer Science, Florida State University, 1999.
"Quality-of-Service Routing for Traffic with Performance Guarantees" by Qingming Ma and Peter Steenkiste; Computer Science Department, Carnegie Mellon University, 1997.
M.R. Garey and D.S. Johnson, "Computers and intractability, a guide to the theory of NP-completeness", Freeman, San Francisco (pp. 34-39), 1979.
Wikipedia, "Bellman-Ford Algorithm", https://en.wikipedia.org/wiki/Bellman%E2%80%93Ford_algorithm, downloaded Sep. 3, 2015.
Wikipedia, "Dijkstra algorithm", https://en.wikipedia.org/wiki/Dijkstra%27s_algorithm, downloaded Sep. 3, 2015.
Wikipedia, "Glossary of graph theory", https://en.wikipedia.org/wiki/Glossary_of_graph_theory, downloaded Sep. 3, 2015.
A.M.S Alkahtani, M.E. Woodward, and K. Al-Begain, "Prioritised best effort routing with four quality of service metrics applying the concept of the analytic hierarchy process" Computing Department, University of Bradford, Mar. 24, 2005.
International Search Report for International application No. PCT/SE2012/051302, Dec. 18, 2013.
PCT Written Opinion of the International Searching Authority for International application No. PCT/SE2012/051302, Dec. 18, 2013.
EPO Extended Search Report, pursuant to Rule 62 EPC for Application No./Patent No. 12888807.0-1857 / 2923466 PCT/SE2012051302—Jul. 13, 2016.
Multi-Constraint-Pruning: An Algorithm for Finding K Shortest Paths Subject to Multiple Constraints by Ziang Zhang; Proceedings of APCC2008—2008.

* cited by examiner

ROUTE DETERMINATION IN A MULTI-HOP NETWORK USING MULTIPLE ROUTING METRICS

PRIORITY

This nonprovisional application is a U.S. National Stage Filing under 35 U.S.C. §371 of International Patent Application Serial No. PCT/SE2012/051302, filed Nov. 26, 2012, and entitled "Route Determination In A Multi-Hop Network Using Multiple Routing Metrics."

TECHNICAL FIELD

The proposed technology generally relates to route determination and routing in a multi-hop network, and more particularly to a method and device for route determination in a multi-hop network, a method and device for routing in a multi-hop network as well as a corresponding network node and computer program.

BACKGROUND

In general, routing can be defined as the act of moving information from a source node to a destination node via one or more intermediate nodes in a communication network.

In a multi-hop network, nodes out of reach from each other may benefit from intermediately located nodes that can forward their messages from the source towards the destination.

Routing generally involves two basic tasks: determining suitable routing paths and transporting information through the network. In the context of the routing process, the first of these tasks is normally referred to as route determination and the latter of these tasks is often referred to as packet forwarding.

For route determination, a common approach is to span a so-called routing tree. The routing tree is normally calculated based on a well-known shortest path algorithm, implying that the determined shortest paths from the various nodes in the tree to the destination node are so-called "least cost paths" where cost is defined in an appropriate manner. In practice, the tree is often continuously built and updated to manage mobility and changing link conditions.

When a particular node in the tree wants to send a packet in the subsequent packet forwarding process, the node is considered a source node, and the packet follows the determined routing path from the source to the destination. Different nodes may send packets to the same destination over time, hence different nodes will act as source nodes and send along their respective shortest path. In addition, as multiple destinations may exist, multiple trees may be generated, each rooted at a corresponding destination.

Routing protocols generally use so-called routing metrics as a base for evaluating which path or route that will be the best for a given packet and thereby determining the optimal route to the destination. In the prior art, many different metrics have been used by the routing algorithms to determine the best, or at least a suitable route.

Often the problem is formulated in terms of finding the route that maximizes or minimizes a certain metric, where the metric may, for example, be the route bit rate capacity, the route power consumption, or the route latency. If the metric is simple enough, there are well-known efficient polynomial-time algorithms for finding the optimal route, e.g. the Bellman-Ford algorithm and the Dijkstra algorithm [8].

In the general case, however, the problem is Non-deterministic Polynomial-time hard, NP-hard [1], i.e. the computational complexity grows exponentially with the number of nodes.

The problem of finding routes under consideration of multiple performance measures, also referred to as metrics, where more than one performance measure or metric, e.g. bit rate and latency, are combined into a so-called composite metric, has been studied in the research literature, e.g. see [1, 4, 5, 6].

Unfortunately, the desire to take multiple routing metrics into account in a composite metric either makes the task of finding optimal routes computationally unfeasible using known algorithms, or when the task is simplified or relaxed, the composite metric will in general not accurately reflect the underlying optimization problem.

It is evident that the routing metric has a substantial effect on route determination, and therefore it is of utmost importance to provide improved strategies for route determination and/or enhanced metrics for determining suitable routes. Improved route determination then naturally leads to improved routing with improved performance such as higher throughput and/or reduced delay in the networks.

SUMMARY

The proposed technology overcomes these and other drawbacks of the prior art arrangements.

It is a general object to provide improved route determination and/or routing in a multi-hop network.

In particular it is an object to provide an improved method for route determination in a multi-hop network.

It is also an object to provide an improved method for routing in a multi-hop network.

It is yet another object to provide an improved device for route determination in a multi-hop network.

Still another object is to provide an improved device for routing in a multi-hop network.

It is also an object to provide a corresponding network node and computer program.

These and other objects are met by the proposed technology as defined by the appended patent claims.

According to a first aspect, there is provided a method for route determination in a multi-hop network, wherein the multi-hop network is represented by a connected graph having nodes and links interconnecting the nodes. The method comprises the step of obtaining a value of a reference route between a source node and a destination node in the connected graph according to a first routing metric. The method further comprises the step of modifying, based on the value of the reference route according to the first routing metric, the connected graph by modifying link cost, with respect to a second routing metric, of at least one link in the connected graph. The method also comprises the step of determining at least part of a route between the source node and the destination node in the modified connected graph, based on the modified link cost, according to the second routing metric.

The proposed technology provides an efficient strategy for taking more than one routing metric into account in the route determination. The value of a reference route according to a first routing metric is used for modifying the connected graph and then at least part of a route between the source node and the destination node is determined in the modified connected graph according to a second routing metric. By using the value of a reference route according to the first metric for modifying the connected graph, the modification of link cost with respect to the second metric will be related to the performance of an actual route between source and destination in the multi-hop network. In this way, the proposed technology makes it possible to find suitable routes under consideration of multiple metrics, with moderate computational complexity.

According to a second aspect, there is provided a method for routing in a multi-hop network. The routing method comprises the steps of performing route determination according to the first aspect, and forwarding data from a given node to at least a neighbor node on the path between the source node and the destination node determined by said at least part of a route.

According to a third aspect, there is provided a device for route determination in a multi-hop network, wherein the device is configured to manage a representation of the multi-hop network as a connected graph having nodes and links interconnecting the nodes. The device comprises an obtainer, a modifier and a determiner. The obtainer is configured to obtain a value of a reference route between a source node and a destination node in the connected graph according to a first routing metric. The modifier is configured to modify, based on the value of the reference route according to the first routing metric, the connected graph by modifying link cost, with respect to a second routing metric, of at least one link in the connected graph. The determiner is configured to determine at least part of a route between the source node and the destination node in the modified connected graph, based on the modified link cost, according to the second routing metric.

According to a fourth aspect, there is provided a device for routing in a multi-hop network. The device comprises a device for route determination according to the third aspect, and a packet forwarder configured to forward data from a given node to at least a neighbor node on the path between the source node and the destination node determined by said at least part of a route.

According to a fifth aspect, there is provided a network node comprising a device according to the third aspect and/or the fourth aspect.

According to a sixth aspect, there is provided a computer program for performing, when running on a computer system, the method according to the first aspect and/or second aspect.

The proposed technology is applicable in a central routing mechanism as well as a distributed routing mechanism.

Other advantages will be appreciated when reading the detailed description.

BRIEF DESCRIPTION OF THE DRAWINGS

The proposed technology, together with further objects and advantages thereof, may best be understood by making reference to the following description taken together with the accompanying drawings, in which.

DETAILED DESCRIPTION

Figure 1:
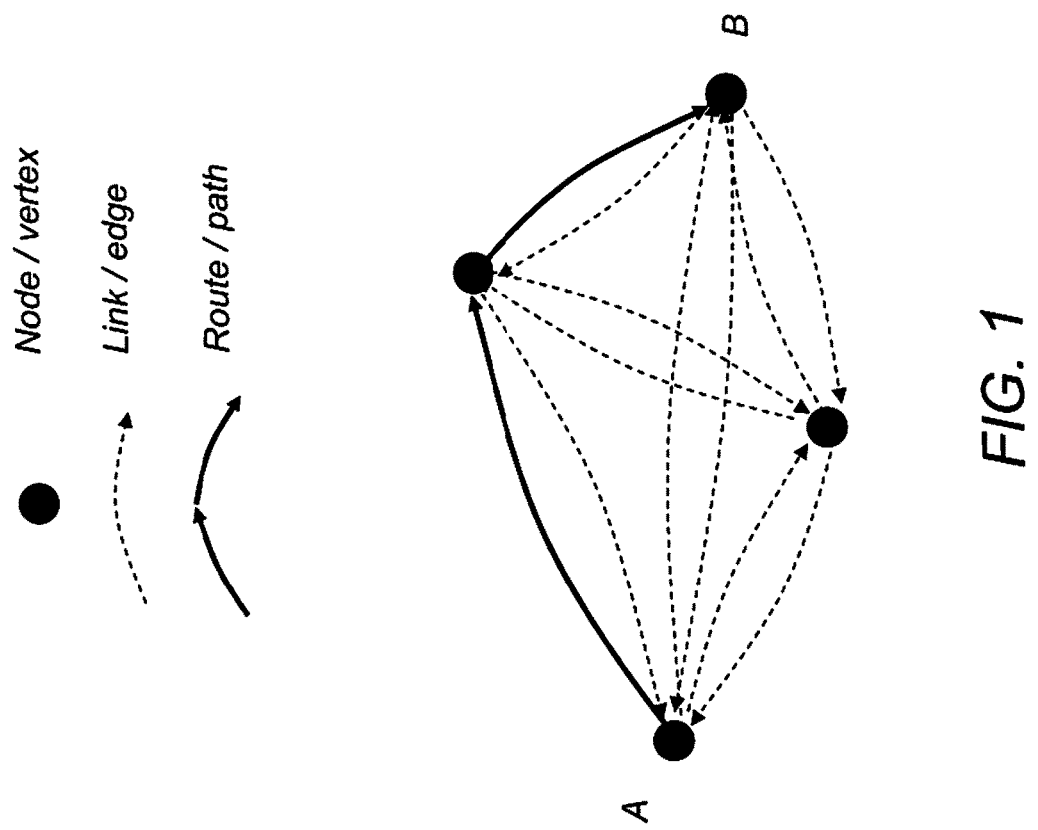
FIG. 1 is a schematic diagram illustrating an example of a simple network represented by a connected graph.

Throughout the drawings, the same reference numbers are used for similar or corresponding elements.

The proposed technology is generally applicable to any routing protocol, independent of implementation, including both distributed and centralized routing algorithms, hop-by-hop routing as well as source-routing, link-state routing and distance-vector routing, proactive or reactive routing, flat or hierarchical routing, single path and multi-path routing, as well as variations and combinations thereof.

In source-routing it is normally assumed that the source end node determines the entire route. The intermediate nodes then merely forwards the packet to the next node on the path to the destination node.

In hop-by-hop routing, each node basically determines and maintains a routing table with information, for each of a number of destinations, of a preferred next hop node. When a node receives a packet, it forwards the packet to the next hop node on the basis of information on the destination of the packet. The forwarding process continues from node to node until the packet reaches the destination.

The network nodes pass routing information and maintain their routing tables through the transfer of various routing information messages. The routing information naturally varies depending on the particular routing scheme used.

Hop-by-hop routing schemes are normally categorized into two main classes, namely link-state and distance-vector algorithms. Link-state algorithms generally flood routing information to all nodes (however solutions flooding only part of the network also exist), but each node then only sends information describing the state of its own links. Distance vector algorithms on the other hand are based on exchanging routing cost information only between neighboring nodes.

The manner in which the routing tables are determined and updated may differ from one routing scheme to another. However, a common objective is normally to find the path that is optimal in some sense, as mentioned in the background section.

For a better understanding of the proposed technology, it may be useful to give a brief overview of an example of a commonly used type of routing algorithm. It should however be understood that the invention is not limited thereto.

A classical approach is to span a so-called shortest path multi-hop tree between a source node and a destination node, where each link is characterized by a delta cost, and each node is assigned an accumulated cost to reach the destination along the determined shortest path. It should be clear that the expression "shortest path" normally corresponds to a minimum cost path, which emphasizes that the path or route is a path that offers the minimum cost with respect to some particular cost metric.

The Bellman-Ford shortest path algorithm will be used as an example of a shortest path algorithm in the following, although the Dijkstra algorithm, or any other routing algorithm for that matter, could be used as well. The Bellman-Ford algorithm has played a central role in wired networks such as the Internet, but also has an important function in wireless multi-hop networks. In a commonly preferred implementation, the Bellman-Ford algorithm provides shortest path determination in a distributed and "uncoordinated" fashion and guarantees convergence within a finite time period based on the exchange of routing cost information between neighboring nodes.

For the Bellman Ford algorithm, the cost $c_i$ of a node i for each destination d of a given set of destinations may thus be determined through the distributed Bellman Ford equation:

$$C_i^{(d)} = \min_{\forall j \in N_i} \{\Delta C_{ij} + C_j^{(d)}\},$$

where $j \in N_i$ is the neighbor index of neighbor nodes belonging to node i, $c_j$ is the cost for neighbor j to reach destination d, and $\Delta C_{ij}$ is the cost to go from node i to $v_j$ (i.e. the cost for a hop, or the link cost).

The number of iterations may be limited to an integer number, thereby upper limiting the number of hops, e.g. a maximum of two hops.

As mentioned above, the Bellman-Ford algorithm is easily implemented in a distributed manner. A multi-hop tree between source and destination in a multi-hop network is built and defined based on routing cost information distributed in the network. In practice, neighboring nodes exchange routing lists. Each routing list contains multiple entries, where each entry specifies a destination node, the routing cost from the node in question to the destination as well as an indication of a next hop node. The routing list is typically sent in a packet, sometimes denoted as a Hello packet.

A node receiving a routing list, checks whether any entry offers a more optimum route than what the node's own list indicates. Often, timestamps or sequence numbers are included together in the entry to ensure that the new cost information is not outdated state information.

For more information on routing techniques, especially in wireless ad hoc networks, reference can be made to [7].

It will now be useful to introduce some further terminology for multi-hop networks. The network can be modeled as a connected graph, also referred to as a directed graph G≡(V,E), where V denotes the set of graph vertices, and E denotes the set of edges. Each network node is then represented by a graph vertex v∈V, and each (potential) wireless link between two nodes is represented by an edge e∈E. A route from a source node (e.g. mesh network egress point) to a destination node (e.g. a user terminal) can be represented by a path P in the network, which is a sequence of vertices $\{v_i\}_{i=1}^K$ such that $v_i \in V$ for all i and $(v_i, v_{i+1}) \in E$ for all i=1, 2, L, K−1, where K denotes the number of vertices on the path P, $v_1$ is the start vertex, and $v_K$ is the end vertex. For any given path P, define E(P) as the set of all edges formed by adjacent vertices on the path P. An example of a graph representation of a network is shown in FIG. 1. We will also use the term subpath, meaning a contiguous set of edges along a given path. For simplicity, vertices and edges will henceforth often be referred to as "nodes" and "links".

As stated above, routing is often performed by first defining a metric μ. The metric in principle assigns a weight $w_\mu(P)$ to each possible (sub)path P in the network. In many cases, it is possible express the (sub)path weight as a simple function of individual link weights. For example, the latency of a path is the sum of the latencies of the individual links (i.e. $w_{latency}(P) = \Sigma_{l \in E(P)} w_{latency}(l)$ thus forming an additive metric), and the bit rate of a path is the minimum (bottleneck) bit rate of the links along the path (i.e. $W_{bitrate}(P) = \min_{l \in E(P)} w_{bitrate}(l)$ thus forming a minimum-metric).

Depending on the metric type, the path weight should either be minimized or maximized. For example, the latency should be minimized, whereas the bit rate should be maximized. It is, however, convenient to consistently use metrics of one of the two types. This can be achieved by converting metrics of the other type to the desired type; for example, instead of bit rate (which should be maximized) one may use the inverse of the bit rate (which should be minimized). In the following the main focus will be on the case of minimizing path weight, but it is apparent to the skilled person how to modify the process for the case when the path weight is to be maximized. On a more general scope, it is common to define a so-called cost, which is a measure or metric that by definition is something that is desirable to minimize. This is consistent with the general concept used in shortest-path routing, or least-cost routing, where the shortest path is defined as the path with minimum cost.

Once the metric is defined, the route that optimizes the metric should be found. If the metric is monotonic and isotonic, there are efficient algorithms for finding the optimal route.

Monotonicity here means that if a path is extended by one more link at either end, the cost or weight is at least as large as the weight of the original path. Hence, given a monotonic metric μ, if any path P is extended by one link $(v_K, v_{K+1})$, where $v_K$ denotes the end vertex of P, to form $P' = \{P, v_{K+1}\}$, then it holds that $w_\mu(P') \geq w_\mu(P)$.

Isotonicity means that the metric preserves the ordering of the weights of two paths when they are extended by a common third link or set of links [6]. Hence, given an isotonic metric μ, if any two paths $P_1$ and $P_2$ that share the same source and destination vertices are extended by a common link where $v_K$ is the end vertex of both $P_1$ and $P_2$, to form $P'_1 = \{P_1, v_{K+1}\}$ and $P'_2 = \{P_2, v_{K+1}\}$, then it holds that $w_\mu(P_1) \geq w_\mu(P_2)$ implies $w_\mu(P'_1) \geq w_\mu(P'_2)$ and vice versa).

Figure 2B:
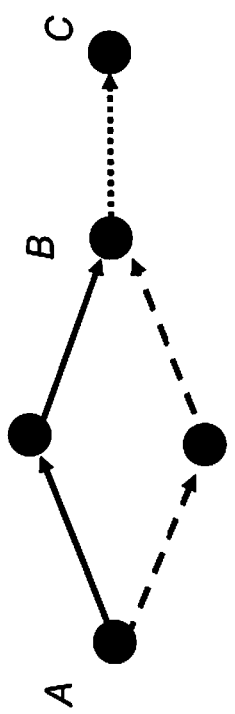
FIGS. 2A-B are schematic diagrams illustrating the concept of isotonicity.
Figure 2A:
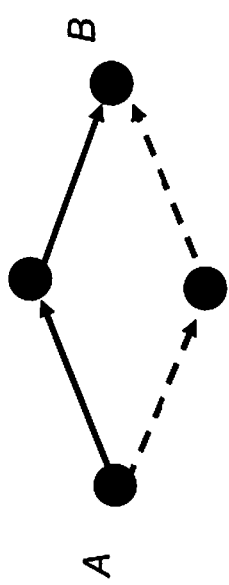

The concept of isotonicity is also illustrated in FIGS. 2A-B. If the metric is isotonic, then the ordering of the two paths from A to B (i.e. which of the solid and the dashed path has the lowest metric) is guaranteed to be unaltered when the two paths are extended with an additional common link (B-C).

It may be noted that if the path weights or costs can be expressed as a sum or maximum of independent and positive constituent link weights (i.e. weights that are independent of what other links are used), the metric will automatically be monotonic and isotonic. However, in a wireless network with interference between links, the weights or costs of existing links will typically change as more links are added to a path, and isotonicity will normally be broken.

Routing can either be centralized (i.e. one central node takes the routing decision) or distributed (i.e. nodes may take routing decisions locally). Centralized routing typically involves three steps: (i) collecting relevant information about the quality of potential links and/or paths, (ii) selecting a path based on the collected information, and (iii) communicating information about the selected path to the relevant nodes. Route determination is related to step (ii).

As previously mentioned, the problem of finding routes under consideration of multiple performance measures or metrics has been frequently studied in the literature.

One approach is to combine the different metrics $\mu_j$, $j=1, \ldots, J$, into one composite metric $\mu_{composite}$ that is both monotonic and isotonic, i.e. one defines $w_{\mu_{composite}}(P)=f(w_{\mu_1}(P), w_{\mu_2}(P), \ldots, w_{\mu_J}(P))$ using an appropriate function $f$. This can for example be achieved by expressing the overall metric as an additive metric, where each link cost or weight is non-negative and independent of which other links are used [3].

Another common approach is to relax the goal of finding an optimal route, and instead just try to find a route whose metrics are below or above certain given bounds (e.g. fulfilling certain quality-of-service (QoS) requirements). Hence, based on a set of constraints $K_j$ one searches for a path P such that $w_{\mu_j} \leq K_j$ for all j; see for example [4], As a variant, one may optimize one metric under certain constraints on the other metrics, see for example [1, 5]. A so reformulated problem has been shown to be, under certain circumstances, solvable with comparatively low complexity (in polynomial time), see for example [6].

Unfortunately, all of the existing solutions described above have drawbacks. Combining multiple performance measures into one composite metric that is both isotonic and monotonic may in principle seem attractive, but in practice it is difficult to find a composite metric that preserves the isotonic property. For example, if we combine (i) a bit rate measure, which is naturally represented by a minimum/maximum metric (bottleneck metric) with (ii) a latency measure, which is naturally represented by an additive metric, through the simple addition operation, the extension of two paths by a common link can shift the bottleneck into the new link and alter the ordering of the metrics of two extended paths, which leads to an non-isotonic metric.

Moreover, even if an isotonic composite metric can be defined, the individual metrics may be disparate enough to make any such combination poorly reflect the performance measures that are to be optimized, cf. discussion in [1]. For example, when combining a bit rate measure with a latency measure, it is difficult to see how any type of isotonic composite metric (minimum/maximum, additive, or other) could accurately reflect the underlying optimization problem in all situations.

Replacing the optimization problem with a problem of finding a route that has individual metrics within given bounds can also have disadvantages. For example, in a wireless network, where radio resources may be scarce, it is often preferable to use as high bit rate as possible in order to transfer the data quickly and thereby free the radio resources for use by other users.

The proposed technology suggests a novel approach for taking more than one routing metric into account in the route determination. In a sense, the proposed technology can be seen as a way to combine two or possibly more routing metrics into a sensible composite metric and a strategy for computationally efficiently finding a route or part thereof that optimizes this metric, even though the metric may be non-isotonic.

Figure 3:
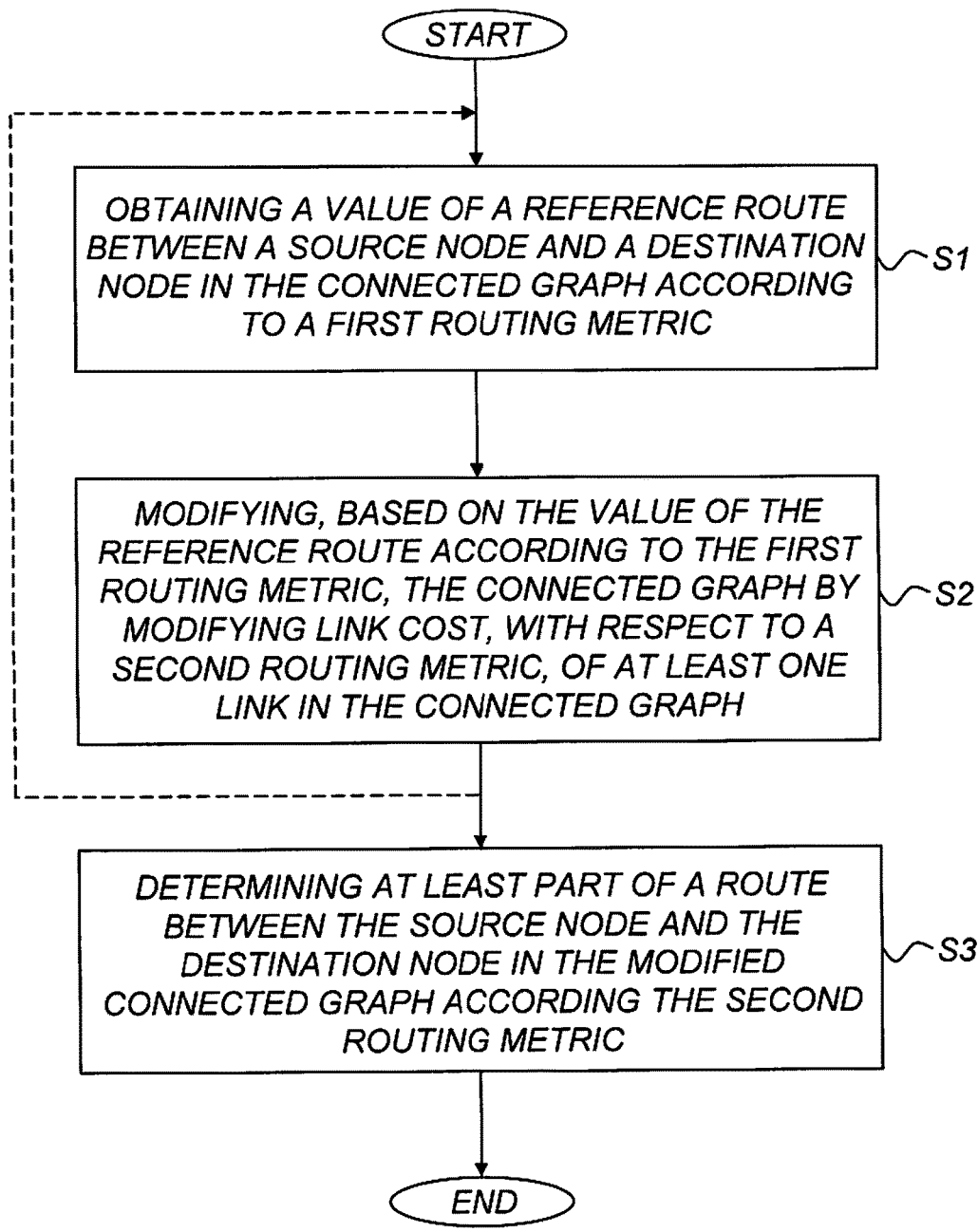
FIG. 3 is a schematic flow diagram illustrating an example of a method for route determination according to an embodiment.

FIG. 3 is a schematic flow diagram illustrating an example of a method for route determination according to an embodiment.

In general, the considered multi-hop network is represented by a connected graph having nodes and links interconnecting the nodes. The method comprises the step S1 of obtaining a value of a reference route between a source node and a destination node in the connected graph according to a first routing metric. The method further comprises the step S2 of modifying, based on the value of the reference route according to the first routing metric, the connected graph by modifying link cost, with respect to a second routing metric, of at least one link in the connected graph. The method also comprises the step S3 of determining at least part of a route between the source node and the destination node in the modified connected graph, based on the modified link cost, according to the second routing metric.

As can be seen, the value of a reference route according to a first routing metric is used for modifying the connected graph and then at least part of a route between the source node and the destination node is determined in the modified connected graph according to a second routing metric. By using the value of a reference route according to the first metric for modifying the connected graph, the modification of link cost with respect to the second metric will be related to the performance of an actual route between source and destination in the multi-hop network.

In this way, the proposed technology provides a computationally efficient way to find suitable routes under consideration of multiple metrics.

Route determination is typically performed using appropriate routing information in the multi-hop network as input. The routing information naturally varies depending on the particular routing scheme or route determination algorithm used.

Figure 4:
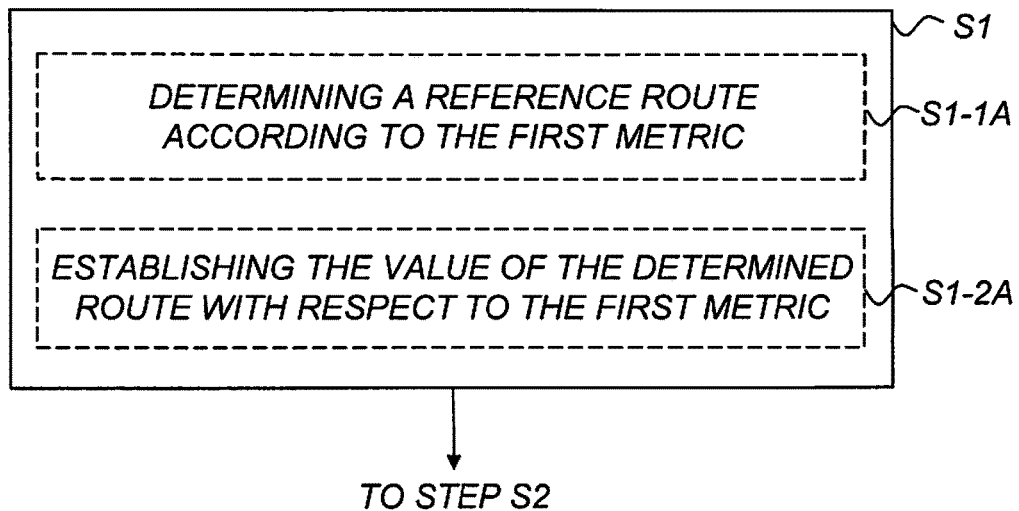
FIG. 4 is a schematic diagram illustrating an example of the obtaining step according to a particular embodiment.

As illustrated in FIG. 4, the value of the reference route can for example be obtained by determining the reference route between the source node and the destination node in the connected graph according to the first routing metric, as indicated in step S1-1A, and then establishing the value of the determined reference route with respect to the first routing metric as indicated in step S1-2A. This may be case with a centralized routing mechanism.

Figure 5:
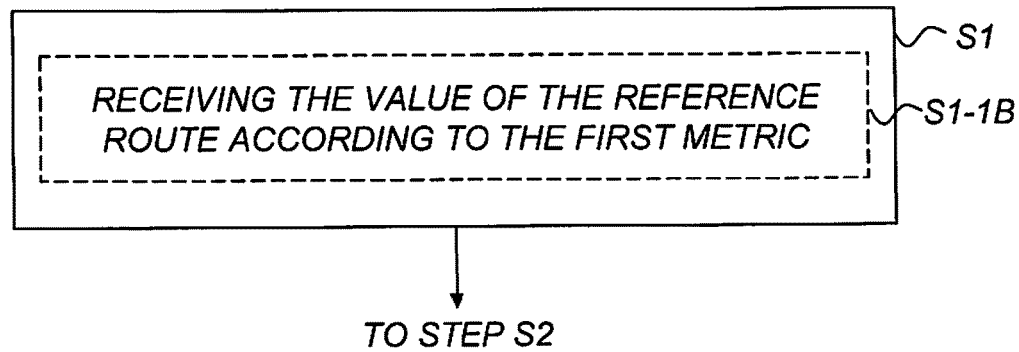
FIG. 5 is a schematic diagram illustrating another example of the obtaining step according to a particular embodiment.

Alternatively, as illustrated in FIG. 5, the value of the reference route is obtained by receiving the value of the reference route according to the first routing metric from a network node, as indicated in step S1-1B. This may be the case with a distributed routing mechanism, where a local network node receives the information from another network node.

Preferably, as will be exemplified later on, the reference route may be selected among the optimal routes according to the first routing metric.

Figure 6:
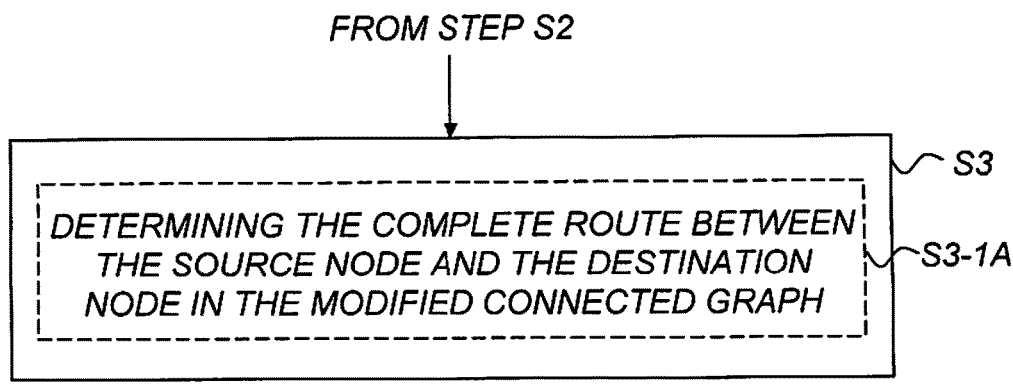
FIG. 6 is a schematic diagram illustrating an example of the determining step according to a particular embodiment.

As illustrated in FIG. 6, the complete route between the source node and the destination node in the modified connected graph may be determined according to the second routing metric, as indicated in step S3-1A. This may be the case with a centralized routing mechanism. For a distributed routing mechanism on the other hand, a local node may determine only part of the overall route.

Figure 7:
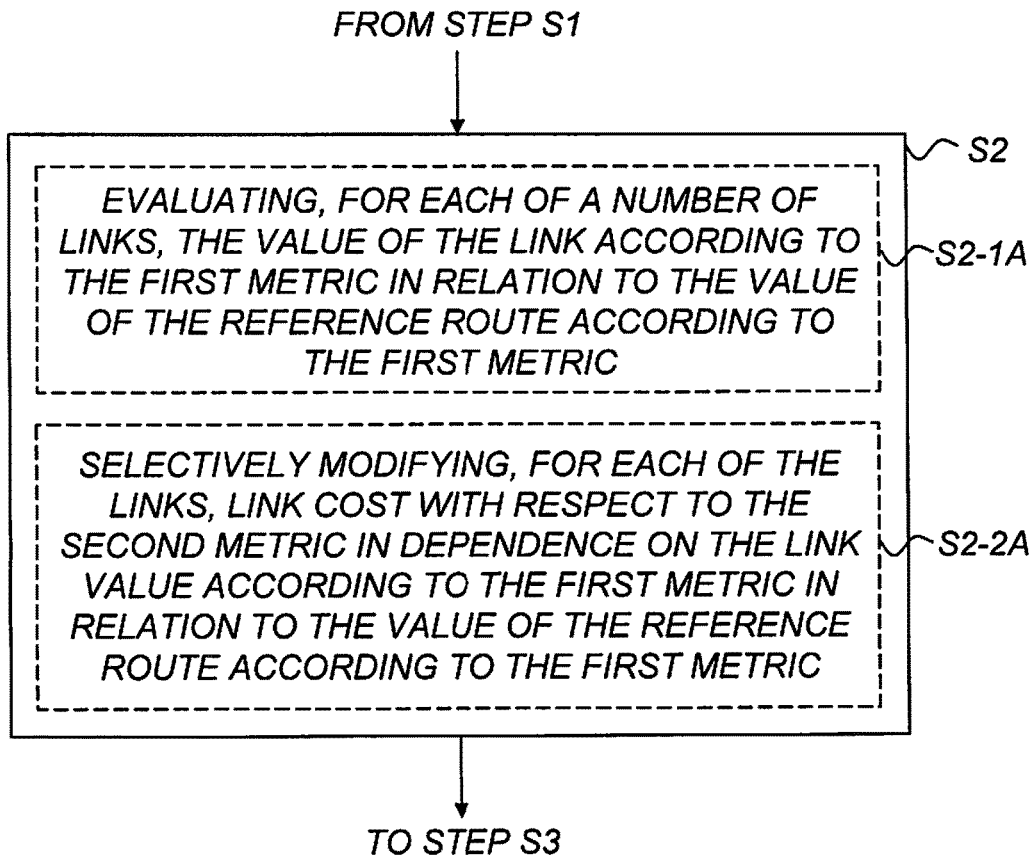
FIG. 7 is a schematic diagram illustrating an example of the modifying step according to a particular embodiment.

FIG. 7 is a schematic diagram illustrating an example of the modifying step according to a particular embodiment. In this particular example, step S2-1A involves evaluating, for each of a number of links in the connected graph, the value of the link according to the first routing metric in relation to the value of the reference route according to the first routing metric. Step S2-2A involves selectively modifying, for each of the links, the link cost with respect to the second routing metric in dependence on the value of the link according to the first routing metric in relation to the value of the reference route according to the first routing metric.

By way of example, the link cost may be modified by modifying, at least in a given interval, the link cost as a smooth continuous function of the value of the link according to the first routing metric in relation to the value of the reference route according to the first routing metric. This is illustrated as example 1) in the curve diagram of FIG. 10.

Figure 8:
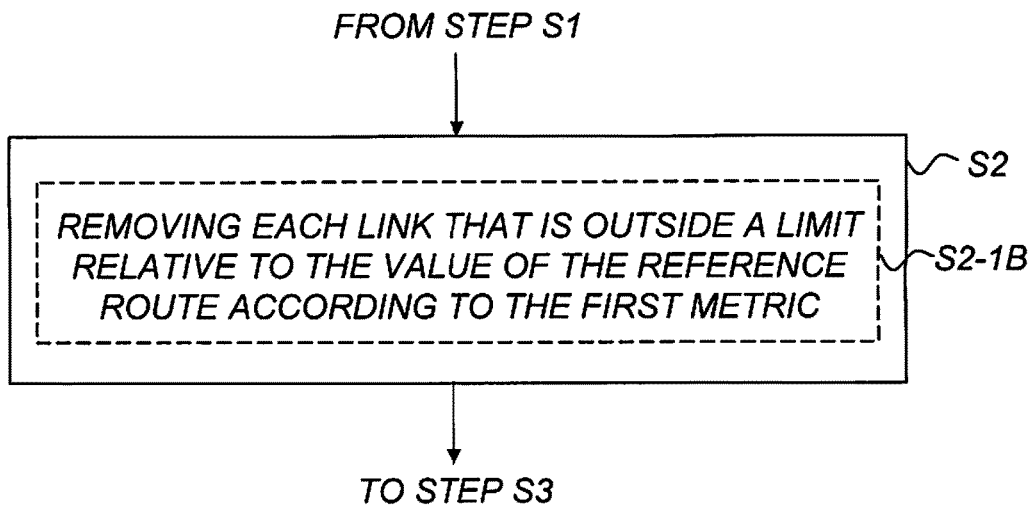
FIG. 8 is a schematic diagram illustrating another example of the modifying step according to a particular embodiment.

The link cost may be modified by increasing the link cost of the link provided the value of the link according to the first routing metric is outside a given limit or threshold relative to the value of the reference route according to the first routing metric. This is preferably accomplished by increasing the link cost according to a step function, as illustrated with examples 2) and 3) in the curve diagram of FIG. 10, where the transition point of the step function is defined by the limit. The step-wise increase may be represented by a finite step as in example 2) but can also be represented by an infinite step ($\infty$) as in example 3). In the latter case, the modification of the connected graph effectively translates into the step of removing each link that is outside a given limit relative to the value of the reference route according to the first routing metric, as illustrated in step S2-1B in FIG. 8. In effect, this results in a trimmed connected graph. Trimming the connected graph may also contribute to a reduction in the computational complexity.

Figure 10:
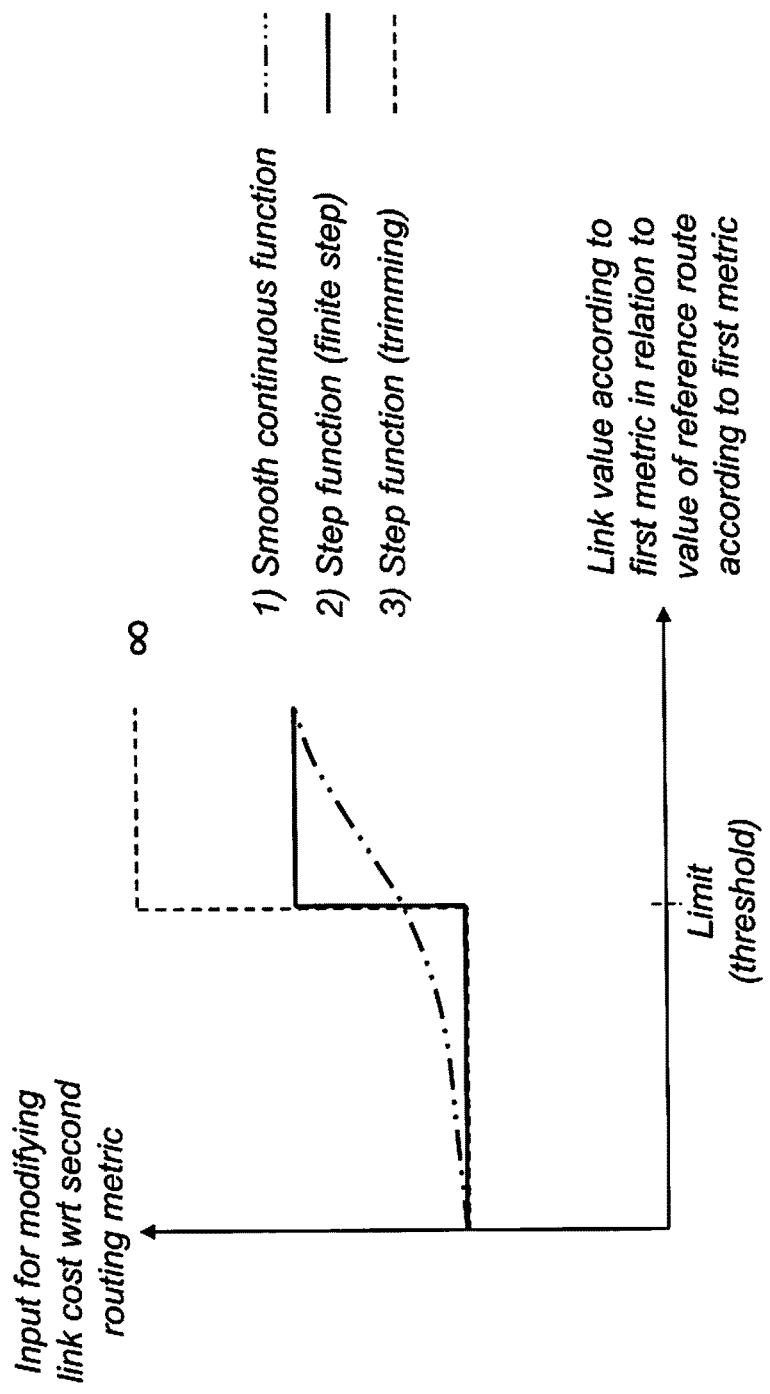
FIG. 10 is a schematic curve diagram illustrating a few examples of the modification of link cost with respect to the second routing metric.

Various hybrids of the curves represented by examples 1), 2) and 3) of FIG. 10 can also be implemented for modification of the link cost with respect to the second routing metric.

As an example, the first routing metric is a minimum or maximum metric and the second routing metric is an additive metric. Preferably, the first routing metric and the second routing metric are monotonic and isotonic metrics.

In a particular example, as will be described in more detail later on, the first routing metric is based on bit rate or throughput.

The second routing metric may for example be based on power consumption or latency, also referred to as delay, of the route.

The proposed method may straightforwardly be generalized to a larger number of metrics by iterating part of the overall procedure. In particular, it is possible to repeat the steps S1 and S2 of obtaining a value of a reference route and modifying the connected graph for at least one additional routing metric, before performing the step S3 of determining at least part of a route, as schematically indicated by the dashed lines in FIG. 3.

Preferably, the multi-hop network is a wireless multi-hop network.

In a particular application example, the wireless multi-hop network comprises a number of self-backhauling access nodes forming a multi-hop mesh network. To cope with the exponential growth in wireless data traffic, it is anticipated that substantially denser deployment of base stations or wireless access nodes will be required in the future. The feasibility of a very dense deployment of wireless access nodes is predicated on the existence of a backhaul network that can provide high-data-rate transport for each individual access node in the network. From the point of view of maximizing capacity, optical-fiber-based backhaul solutions are probably the most desirable ones and are most suitable for new constructions. However, in existing buildings and infrastructure, the cost of installation of new fibers to every access node in a very dense network can be prohibitive. An alternative to the optical backhaul solution is the wireless self-backhaul solution, where the same access spectrum is used to provide transport. With self-backhauling, an access node serves not only its own assigned user equipments (UEs) in its vicinity but also its neighboring access nodes as a relaying node in order to route data towards and/or from an information aggregation node in the network. A group of self-backhauling access nodes can form a multi-hop mesh network. Access nodes cooperatively route each other's traffic to and from the aggregation node.

Figure 9:
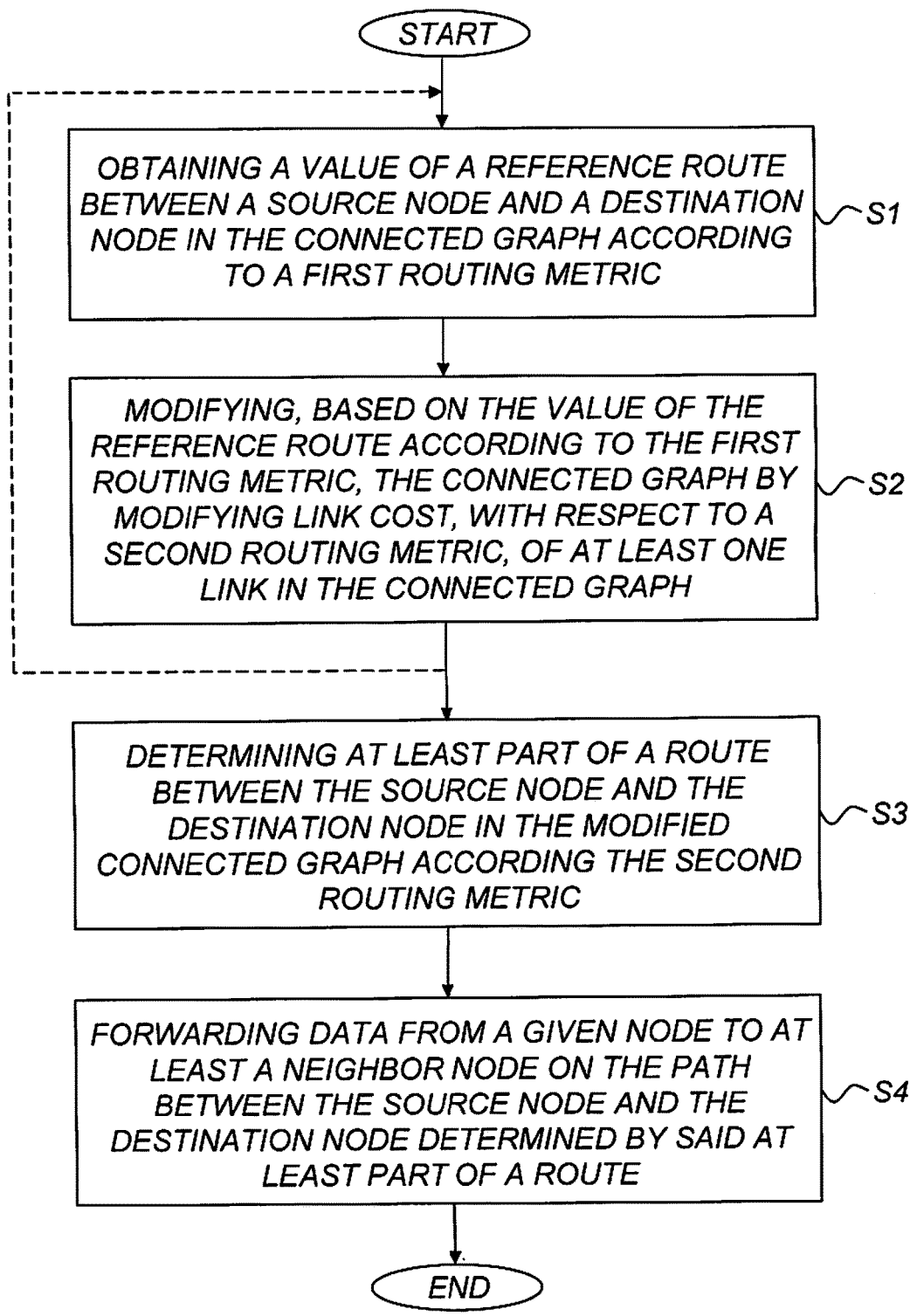
FIG. 9 is a schematic flow diagram illustrating an example of a method for routing according to an embodiment.

FIG. 9 is a schematic flow diagram illustrating an example of a method for routing according to an embodiment. The routing method of FIG. 9 is based on performing route determination according to steps S1 to S3 in direct correspondence with the method of FIG. 3. Step S4 in the flow diagram of FIG. 9 involves forwarding data from a given node to at least a neighbor node on the path between the source node and the destination node determined by said at least part of a route.

In the following, the proposed technology will be described with reference to a few particular, non-limiting examples for illustrative purposes. In particular, specific examples of routing metrics will be referred to, as well as specific examples modification of the connected graph such as trimming.

In a particular example, the idea is to define as optimal route a route that has as low as possible power consumption while still reaching at least a certain predefined fraction k (e.g. 95%) of the maximum possible bit rate that would be attainable if the power consumption were not considered. In other words, one primarily attempts to reach as high bit rate as possible, but is willing to sacrifice some of the bit rate (1−k, e.g. 5%) in order to reduce power consumption. With such a composite metric, the optimal route can be found in two steps:

First the highest-bit-rate route is found without considering power consumption. Since the bit-rate metric is monotonic and isotonic, any conventional efficient algorithm such as Bellman-Ford or Dijkstra can be used. Let $R_{max}$ denote the maximum bit rate.

Then one starts anew, this time first removing, as a particular example, from the network all links with maximum possible bit rate below $kR_{max}$. The so trimmed network can easily be shown to still allow all routes with bottleneck bit rate larger than or equal to $kR_{max}$, but no other routes. In this network, the route with the lowest power consumption is then sought. Since the power consumption metric is isotonic, that route can be efficiently found using, for example, the Bellman-Ford or Dijkstra algorithm.

On a higher level, the proposed technology can be regarded as a way of combining two (or possibly more) different metrics into a sensible composite metric and a method for computationally efficiently (in polynomial time) finding a route that optimizes this metric or close thereto, even though the metric may be non-isotonic.

In a sense, the combining of two metrics $\mu_A$ and $\mu_B$ can be exemplified as follows: A composite metric, $\mu_{composite}$ is defined by ascribing to each path P a weight:

$$w_{\mu_{composite}}(P) = \begin{cases} +\infty & \text{if } w_{\mu_A}(P) \geq C(s,d) \\ w_{\mu_B}(P) & \text{otherwise} \end{cases}$$

where $C(s,d) = f'(\min_{P' \in P(s,d)} w_{\mu_A}(P'))$ is a threshold expressed via a predefined function $f'$, s is the source vertex of P, d is the destination vertex of P, and P(s,d) is the set of all paths from s to d in the network.

Hence, expressed in words, the weight or cost of a path or link according to the composite metrics is:
+∞ if the metric-A weight for the path is above a certain threshold, where the threshold is a predefined function of the lowest metric-A weight that any path with the same source vertex and destination vertex has,
otherwise the metric-B weight of the path.

It should be noted that the composite metric defined here is not only a function of the individual metrics $w_{\mu_A}(P)$ and $w_{\mu_B}(P)$ for the path P, but also considers information about other paths P' in the network in a specific way.

The formation of the composite metric can be generalized in several ways. Some generalizations will be implicitly defined from the following example of a method for finding an 'optimal' route from two or more metrics.

Note that one possible way to interpret such a composite metric is to first search for the 'optimal' route(s) according to the first metric $\mu_A$, modify or trim the connection graph to keep only those links that are good enough to be within a tolerance of the optimal metric with respect to $\mu_A$, and then search for the optimal route(s) with respective to the second metric $\mu_B$ on the modified or trimmed connection graph.

The resulting route(s) found in such a manner is/are guaranteed to perform well with respect to both $\mu_A$ and $\mu_B$, while both search steps involve only isotonic metrics and can therefore employ any existing, efficient routing algorithm.

A particular example of a method for finding an optimal route from source to destination in accordance with a composite metric defined as above will be further explained in the following:

1) First, the optimal route(s) is found based on one of the metrics, say $\mu_A$. If the metric is simple enough, this route(s) can be found efficiently in polynomial time. For example, if $\mu_A$ is monotonic and isotonic, the Bellman-Ford or Dijkstra algorithm can be used. The metric $\mu_A$ could for example consist of link costs or weights that are the inverse of the link's bit rate capacity, where the bottle-neck metric would be the maximum of the individual link metrics along a path, and consequently the metric would be termed as a maximum-metric.

2) Secondly, an acceptable limit for $\mu_A$ is determined based on the value or weight of the optimal route(s) in the first step. This limit could e.g. be selected as the value or weight corresponding to a bit rate that is 90% of the optimal route's bit rate capacity. The limit can in the general case also be a soft limit, e.g. a function representing how acceptable different bit rates are in relation to the optimal route's bit rate.

3) Next, the network is modified or trimmed based on the limit determined in the previous step. For example, the trimming could involve removing all links in the network whose bit rate capacity is below the bit rate corresponding to the limit on $\mu_A$. It is then easy to see that the trimming (a) does not disallow any route having a bit rate capacity above the limit bit rate (because such routes could anyway not have utilized any of the removed links) and (b) leads to a network in which all possible routes have bit rates equal to or exceeding the limit bit rate (since all individual links support this bit rate). These properties will be useful in a later step. In the more general case, the modification can be soft, i.e. links may not be completely removed but rather penalized in terms of increasing the weights of the other metric ($\mu_B$).

4) Then, an optimal route based on $\mu_B$ is found in the trimmed network. If $\mu_B$ is simple enough, this step has moderate (polynomial-time) computational complexity. The so found optimal route will then be guaranteed to be on the right side of the limit determined in the second step. For example, in the case of $\mu_A$ representing the bit rate capacity, the properties (a) and (b) established above will ensure that the found route has a bit rate at least equal to the limit bit rate.

One possible extension could be to iteratively determine the acceptable limit on metric $\mu_A$. After selecting a suitable limit on $\mu_A$ and executing the steps 3) and 4) above, the metric $\mu_B$ of the best path is known. If this value is good enough the algorithm is done (baseline as discussed above). If the winning path has a non-acceptable metric $\mu_B$ the algorithm goes back to step 2) and sets a new limit for $\mu_A$, e.g. if the limit has been set in the first run to 90% it could now be set to 80% and the network is then modified or trimmed accordingly. Steps 3) and 4) are executed in the new modified/trimmed network. If the resulting metric $\mu_B$ is still not acceptable the algorithm jumps again back to step 2) and sets an even more relaxed limit for $\mu_A$, and so on.

Another extension is to swap the order of metrics. First—as outlined above—best path(s) with respect to metric $\mu_A$ is determined, a suitable limit for $\mu_A$ is determined, the network is modified/trimmed, and the best path in the modified/trimmed network with respect to metric $\mu_B$ is determined. The winning path is denoted P1 and the associated metrics $\mu_A(P1)$ and $\mu_B(P1)$. In the second phase the same steps are executed, but with metrics $\mu_A$ and $\mu_B$ exchanged, i.e. best path(s) with respect to metric $\mu_B$ is determined, a suitable limit for $\mu_B$ is determined, the network is modified/trimmed, and the best path in the modified/trimmed network with respect to metric $\mu_A$ is determined. The winning path is denoted P2 and the associated metrics $\mu_A(P2)$ and $\mu_B(P2)$. Both P1 and P2 have different $\mu_A$ and $\mu_B$ associated with them. The selection between P1 and P2 considers $\mu_A$ and $\mu_B$ of both paths, i.e.

$$P = \arg\min_{P' \in \{P1, P2\}} f(\mu_A(P'), \mu_B(P')),$$

where $f(\ )$ is an appropriate function combining $\mu_A$ and $\mu_B$.

The proposed technology may also be straightforwardly generalized to a larger number of metrics by iterating the procedure. For example, for more than two metrics, one can first modify/trim the graph to keep only $k_1$-optimal links for the first metric, and then further modify/trim the graph to keep only $k_2$-optimal links, and so forth. Finally, find the optimal path according to the last metric over the trimmed graph. Also, one or both of the metrics $\mu_A$ and $\mu_B$ may in turn be composite metrics composed from other more basic monotonic and isotonic metrics.

Further, as a practical alternative to finding the optimal route in the first step 1), one may use a simplified algorithm to find a route that is good enough based on some criterion, and then use that route instead of the optimal route as basis for the remaining steps 2) to 4).

Figure 11:
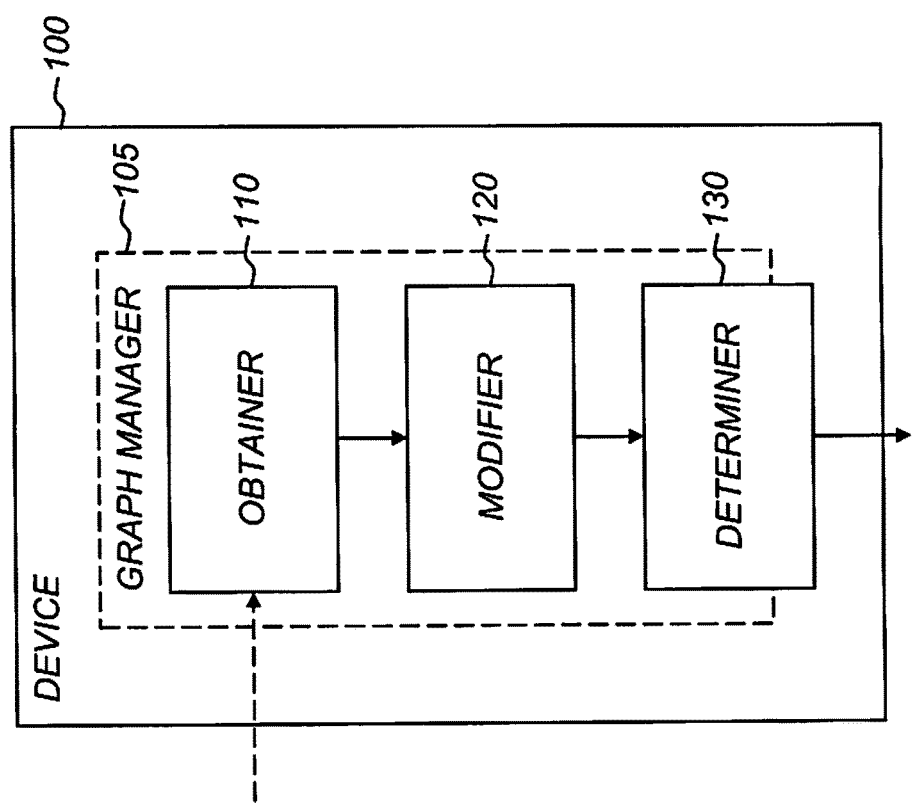
FIG. 11 is a schematic block diagram illustrating an example of a device for route determination according to an embodiment.

FIG. 11 is a schematic block diagram illustrating an example of a device for route determination in a multi-hop network according to an embodiment. The device is configured to manage a representation of the multi-hop network as a connected graph having nodes and links interconnecting said nodes. The device 100 comprises an obtainer 110, a modifier 120 and a determiner 130. The obtainer 110 is configured to obtain a value of a reference route between a source node and a destination node in the connected graph according to a first routing metric. The modifier 120 is configured to modify, based on the value of the reference route according to the first routing metric, the connected graph by modifying link cost, with respect to a second routing metric, of at least one link in the connected graph. The determiner 130 is configured to determine at least part of a route between the source node and the destination node in the modified connected graph, based on the modified link cost, according to the second routing metric.

For example, the device may be configured to operate with a first routing metric that is based on bit rate or throughput, and configured to operate with a second routing metric that is based on power consumption or latency of the route.

It is assumed that the device 100 for route determination has some basic functionality configured to manage a representation of the multi-hop network as a connected graph. This functionality can for example be implemented as a graph manager 105 that is interoperable with the obtainer 110, modifier 120 and determiner 130 as and when needed. The functionality for managing the representation of the multi-hop network as a connected graph may alternatively be integrated as part of the obtainer 110, modifier 120 and determiner 130.

Figure 12:
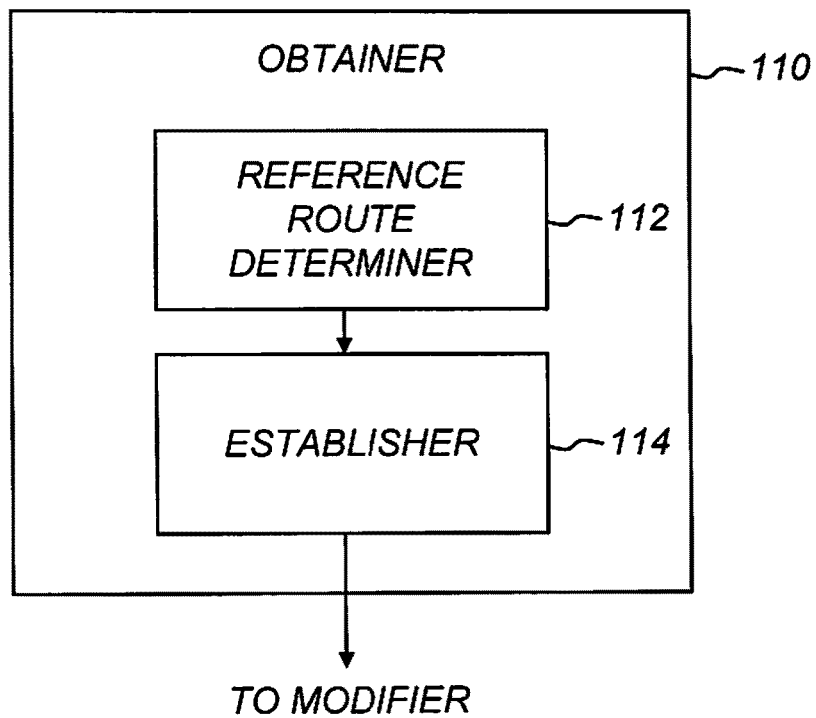
FIG. 12 is a schematic block diagram illustrating an example of the obtainer according to a particular embodiment.

FIG. 12 is a schematic block diagram illustrating an example of the obtainer according to a particular embodiment. In this example, the obtainer 110 comprises a reference route determiner 112 and an establisher 114. The reference route determiner 112 is configured to determine the reference route between the source node and the destination node in the connected graph according to the first routing metric. The establisher 114 is configured to establish the value of the determined reference route with respect to the first routing metric.

Figure 13:
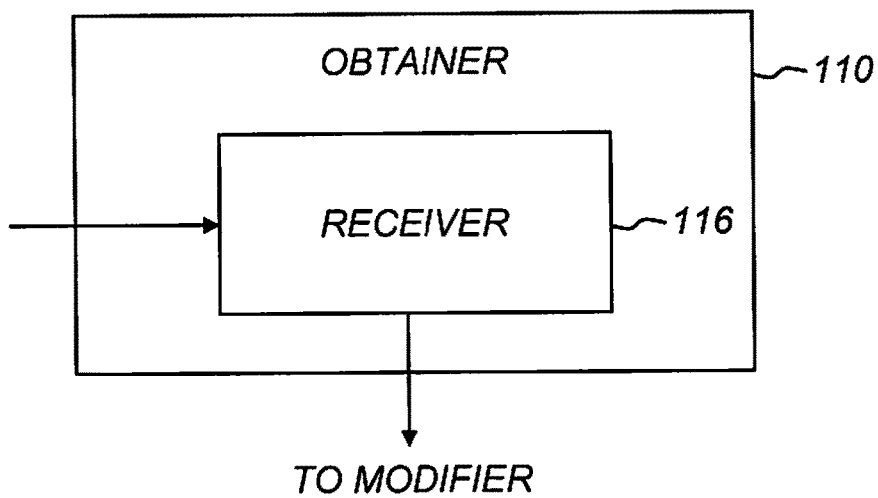
FIG. 13 is a schematic block diagram illustrating another example of the obtainer according to a particular embodiment.

FIG. 13 is a schematic block diagram illustrating another example of the obtainer according to a particular embodiment. In this example, the obtainer 110 comprises a receiver 116 configured to receive the value of the reference route according to the first routing metric from a network node.

By way of example, the obtainer 110 is preferably configured to obtain a value of a reference route that is selected among the optimal routes according to the first routing metric.

For example, the determiner 130 may be configured to determine the complete route between the source node and the destination node in the modified connected graph according to the second routing metric. This may be case with a centralized routing mechanism. For a distributed routing mechanism on the other hand, a local node may only need to determine part of the overall route.

Figure 14:
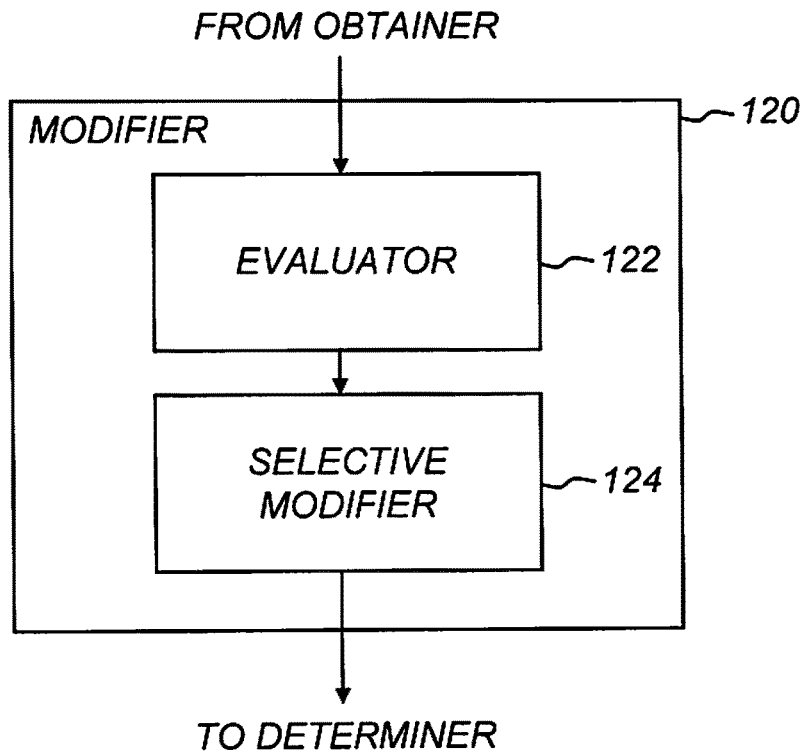
FIG. 14 is a schematic block diagram illustrating an example of the modifier according to a particular embodiment.

FIG. 14 is a schematic block diagram illustrating an example of the modifier according to a particular embodiment. In this particular example, the modifier 120 comprises an evaluator 122 and a selective modifier 124. The evaluator 122 is configured to evaluate, for each of a number of links in the connected graph, the value of the link according to the first routing metric in relation to the value of the reference route according to the first routing metric. The selective modifier 124 is configured to selectively modify, for each of the links, the link cost with respect to the second routing metric in dependence on the value of the link according to the first routing metric in relation to the value of the reference route according to the first routing metric.

As an example, the selective modifier 124 is configured to modify, at least in a given interval, the link cost as a smooth continuous function of the value of the link according to the first routing metric in relation to the value of the reference route according to the first routing metric. Reference can be once again be made to FIG. 10 and the previous description in connection therewith.

The selective modifier 124 may for example be configured to increase the link cost of the link provided the value of the link according to the first routing metric is outside a given limit relative to the value of the reference route according to the first routing metric.

By way of example, the selective modifier 124 may be configured to increase the link cost according to a step function, where the transition point of the step function is defined by the given limit.

Figure 15:
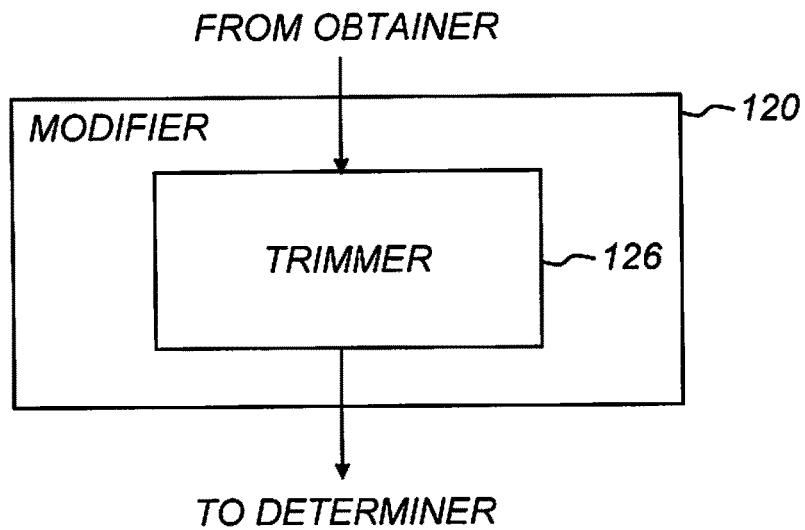
FIG. 15 is a schematic block diagram illustrating another example of the modifier according to a particular embodiment.

FIG. 15 is a schematic block diagram illustrating another example of the modifier according to a particular embodiment. In this example, the modifier 120 comprises a trimmer 126 configured to remove each link that is outside a given limit relative to the value of the reference route according to the first routing metric to provide a trimmed connected graph.

Figure 16:
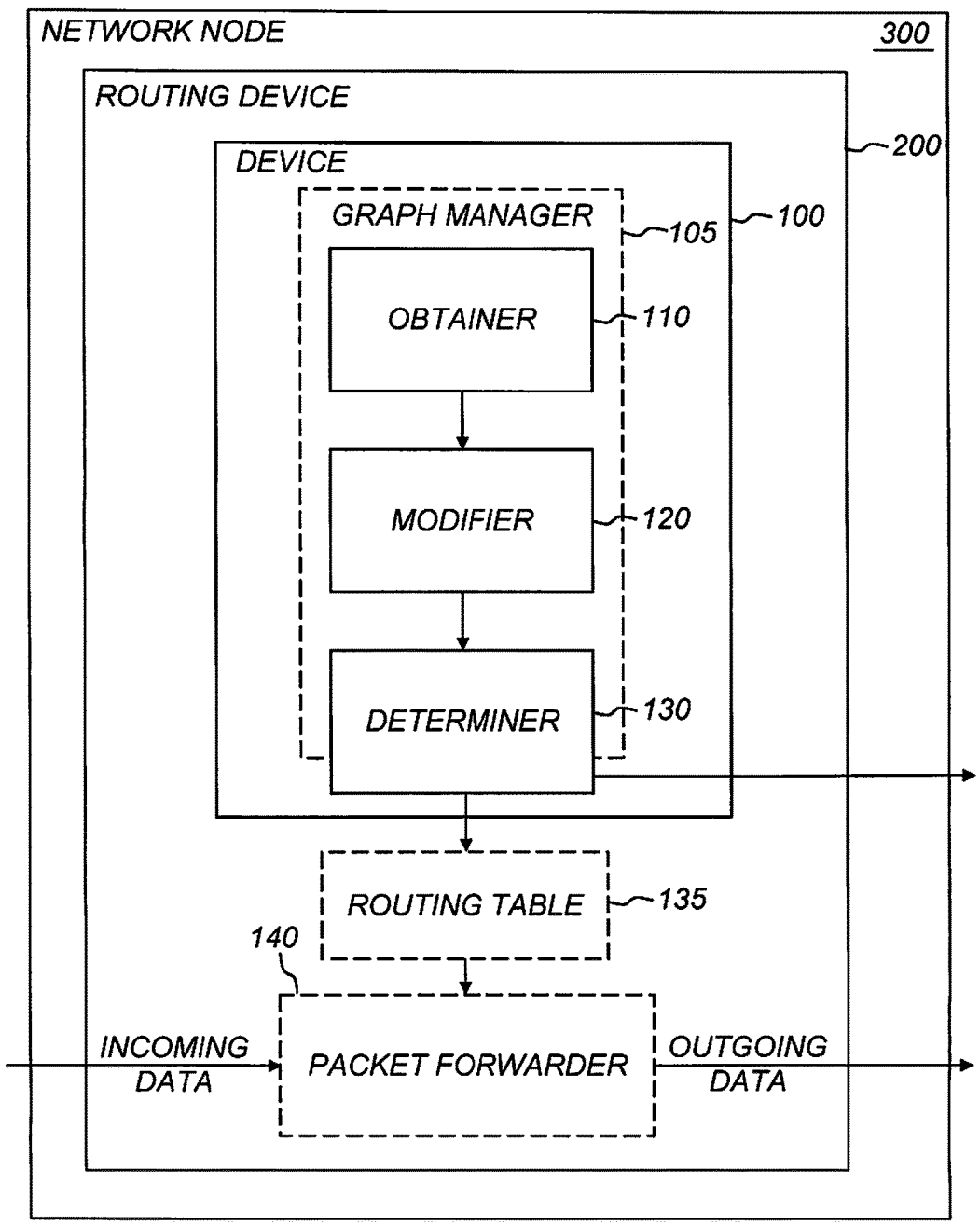
FIG. 16 is a schematic block diagram illustrating an example of a device for routing and a network node comprising such a routing device according to an embodiment.

As illustrated in FIG. 16, the device 100 for route determination may be implemented in a routing device 200, which in turn may be implemented in a network node 300.

FIG. 16 is a schematic block diagram illustrating an example of a device for routing and a corresponding network node comprising such a routing device according to an embodiment. Basically, the routing device 200 comprises the device 100 for route determination of FIG. 11, an optional routing table 135 and an optional packet forwarder 140. As previously described, the device 100 for route determination is configured to determine at least part of a route between source and destination in the modified connected graph. This information can then be passed onto other network nodes in the multi-hop network and/or used to update the routing table 135. The optional routing table 135 may for example be integrated in the packet forwarder 140. The optional packet forwarder 140 may be configured to forward data from a given node to at least a neighbor node on the path between the source node and the destination node determined by said at least part of a route.

In the example of FIG. 16, the network node 300 includes the routing device 200, but may naturally include other well-known components, e.g. for communication with other network nodes.

In general, network nodes pass routing information and maintain their routing tables through the transfer of various routing information messages. The routing information naturally varies depending on the particular routing scheme used. The manner in which the routing tables are determined and updated may also differ from one routing scheme to another.

In a particular example, the network node 300 is a central node of a central routing mechanism. The central node may or may not be actively participating in the actual packet forwarding. In the former case, the node is one of the nodes on the path from the source-node to the destination node, and participates in packet forwarding at least part of the path. In the latter case, the central node may simply be responsible for route determination and passes information about the determined route to the concerned nodes in the multi-hop network.

Alternatively, the network node 300 is one of the nodes in the multi-hop network operating according to a distributed routing mechanism, such as the previously described Bellman-Ford or Dijkstra routing algorithms.

It will be appreciated that the methods and devices described above can be combined and re-arranged in a variety of ways, and that the methods can be performed by one or more suitably programmed or configured digital signal processors and other known electronic circuits, e.g. discrete logic gates interconnected to perform a specialized function, or application-specific integrated circuits.

Many aspects of the proposed technology are described in terms of sequences of actions that can be performed by, for example, elements of a programmable computer system.

The steps, functions, procedures and/or blocks described above may be implemented in hardware using any conventional technology, such as discrete circuit or integrated circuit technology, including both general-purpose electronic circuitry and application-specific circuitry.

Alternatively, at least some of the steps, functions, procedures and/or blocks described above may be implemented in software for execution by a suitable computer or processing device such as a microprocessor, Digital Signal Processor (DSP) and/or any suitable programmable logic device such as a Field Programmable Gate Array (FPGA) device and a Programmable Logic Controller (PLC) device.

It should also be understood that it may be possible to re-use the general processing capabilities of any device or unit in which the present technology is implemented, such as a base station, network controller or scheduling node. It may also be possible to re-use existing software, e.g. by reprogramming of the existing software or by adding new software components.

In the following, an example of a computer-implementation will be described with reference to FIG. 17.

Figure 17:
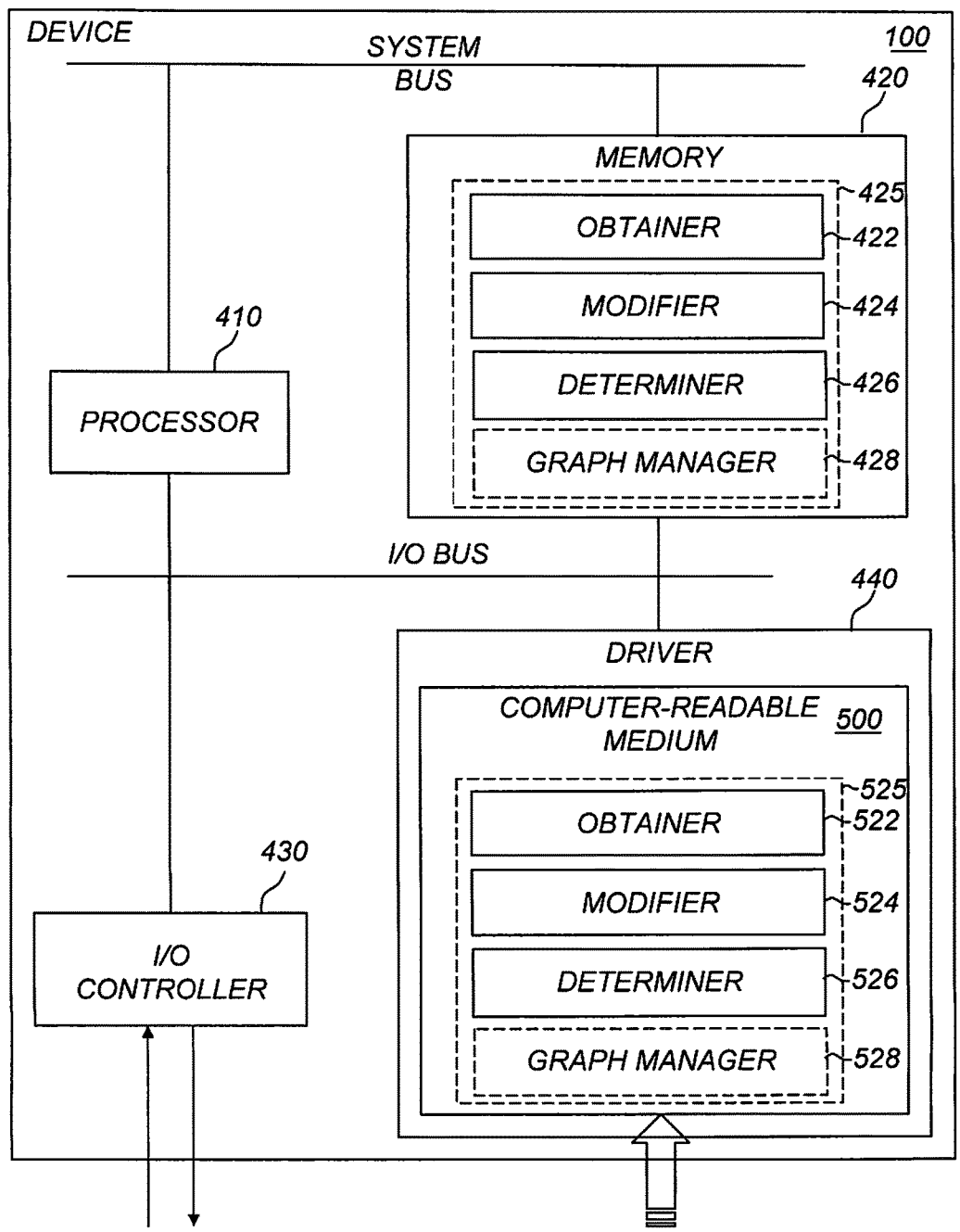
FIG. 17 is a schematic diagram illustrating an example of a computer-implementation of the route determination including a computer program for execution by a suitable processor according to an embodiment.

FIG. 17 is a schematic diagram illustrating an example of a computer-implementation of the route determination including a computer program for execution by a suitable processor according to an embodiment.

The device 100 of this embodiment is based on a processor 410 such as a micro processor or digital signal processor, a memory 420, an input/output (I/O) controller 430 and an optional driver 440 for a computer-readable medium 500.

In this particular example, at least some of the steps, functions and/or blocks described above are implemented in software, which is loaded into memory 420 for execution by the processor 410. The processor 410 and the memory 420 are interconnected to each other via a system bus to enable normal software execution. The I/O controller 430 may be interconnected to the processor 410 and/or memory 420 via an I/O bus to enable input and/or output of relevant data such as input parameter(s) and/or resulting output parameter(s).

In this particular example, the memory 420 includes a computer program 425 for implementing the functionality of the embodiments described above including steps, functions, procedures and/or blocks.

More particularly, the I/O controller 430 may receive routing information and/or network information that can be transferred to the processor 410 and/or memory 420 for use as input during execution of the computer program 425 to perform the proposed route determination. In this example, the computer program 425 is defined by the computer program modules represented by an obtainer 422, a modifier 424, a determiner 426 and an optional graph manager 428. The corresponding route or part route determined by the computer program 425 may then be transferred as output via the I/O controller 430.

Moreover, the present technology can additionally be considered to be embodied within any form of computer-readable medium having stored therein an appropriate set of instructions for use by or in connection with an instruction-execution system, apparatus, or device, such as a computer-based system, processor-containing system, or other system that can fetch instructions from a medium and execute the instructions. The software, here exemplified in the form of computer program 525, may then be realized as a computer program product, which is normally carried on a non-transitory computer-readable medium 500, for example a CD, DVD, USB memory, hard drive or any other conventional memory device. The computer program 525 may thus be loaded into the memory 420 of the device 100 or equivalent computer or processing system for execution by the processor 410. In this example, the computer program 525 is defined by the computer program modules represented by an obtainer 522, a modifier 524, a determiner 526 and an optional graph manager 528.

The computer/processor/controller does not have to be dedicated to execute only the above-described steps, functions, procedure and/or blocks, but may also execute other software tasks.

The embodiments described above are merely given as examples, and it should be understood that the proposed technology is not limited thereto. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] Zheng Wang and Jon Crowcroft, "Quality-of-service routing for supporting multimedia applications", IEEE Journal Selected Areas in Communications, vol. 14, no. 7, 1996.
[2] Joao Luis Sobrinho, "Network routing with path vector protocols: Theory and applications", in Proc. ACM SIGCOMM, Karlsruhe, Germany, August 2003, pp. 49-60.
[3] Derya Yiltas and Harry Perros, "QoS-based multi-domain routing under multiple QoS metrics", IET Communications, Vol 5 (2011) pp 327-336.
[4] Qingming Ma and Peter Steenkiste, "Routing traffic with quality-of-service guarantees in integrated services networks", 8th International Workshop on Network and Operating Systems Support for Digital Audio and Video (NOSSDAV 98).
[5] Waldir A. Moreira, Elisangela Aguiar, Antonio Abelém, Michael Stanton, "Using multiple metrics with the optimized state routing protocol for wireless mesh networks", in: 26° Simpósio Brasileiro de Redes de Computadores e Sistemas Distribuidos, 2008.
[6] Qingming Ma and Peter Steenkiste, "Quality-of-Service Routing for Traffic with Performance Guarantees", In Proc. IFIP International Workshop on Quality of Service, 1997.

[7] X. Zou, B. Ramamurthy, S. Magliveras, "Routing Techniques in Wireless Ad Hoc Networks—Classification and Comparison" Proc. of the Sixth World Multiconference on Systemics, Cybernetics, and Informatics—SCI, July 2002.

[8] John Baras, George Theodorakopoulos, "Path problems in networks", Synthesis Lectures on Communication Networks, ed. Jean Walrand, Morgan & Claypool Publishers, 2012, pp. 1-5.

The invention claimed is:

1. A method for route determination in a multi-hop network, wherein said multi-hop network is represented by a connected graph having nodes and links interconnecting said nodes, said method comprising:
   obtaining a value of a reference route between a source node and a destination node in said connected graph according to a first routing metric;
   evaluating a value of a link in said connected graph according to said first routing metric in relation to the value of the reference route according to said first routing metric; and
   selectively modifying, at least in a given interval, a link cost of at least one link with respect to a second routing metric in dependence on the value of the link in said connected graph according to said first routing metric in relation to the value of the reference route according to said first routing metric; and
   determining at least part of a route between said source node and said destination node in said modified connected graph, based on the modified link cost, according to said second routing metric, and
   wherein selectively modifying the link cost of the at least one link with respect to said second routing metric comprises modifying, at least in a given interval, the link cost as a smooth continuous function of the value of the at least one link according to said first routing metric in relation to the value of the reference route according to said first routing metric.

2. The method of claim 1, wherein obtaining the value of the reference route comprises:
   determining the reference route between said source node and said destination node in said connected graph according to said first routing metric; and
   establishing the value of the determined reference route with respect to said first routing metric.

3. The method of claim 1, wherein obtaining the value of the reference route comprises receiving the value of the reference route according to said first routing metric from a network node.

4. The method of claim 1, wherein said reference route is selected among optimal routes according to said first routing metric.

5. The method of claim 1, wherein determining the at least part of the route comprises determining a complete route between said source node and said destination node in said modified connected graph according to said second routing metric.

6. The method of claim 1, wherein selectively modifying the link cost of the at least one link with respect to said second routing metric comprises increasing the link cost of the at least one link provided the value of the at least one link according to said first routing metric is outside a given limit relative to the value of the reference route according to said first routing metric.

7. The method of claim 1, wherein modifying the connected graph comprises removing each link that is outside a given limit relative to the value of the reference route according to said first routing metric to provide a trimmed connected graph.

8. The method of claim 7, wherein said second routing metric is based on power consumption or latency of the route.

9. The method of claim 1, wherein said first routing metric is a minimum or maximum metric and said second routing metric is an additive metric.

10. The method of claim 1, wherein obtaining a value of a reference route and modifying the connected graph are repeated for at least one additional routing metric, before determining at least part of a route.

11. The method of claim 1, further comprising:
   forwarding data from a given node to at least a neighbor node on a path between said source node and said destination node determined by said at least part of the route.

12. A device for route determination in a multi-hop network, wherein said device is configured to manage a representation of said multi-hop network as a connected graph having nodes and links interconnecting said nodes, said device comprising:
   a memory storing instructions;
   a processor is configured to execute instructions to:
      obtain a value of a reference route between a source node and a destination node in said connected graph according to a first routing metric;
      evaluate a value of a link in said connected graph according to said first routing metric in relation to the value of the reference route according to said first routing metric; and
      selectively modify a link cost of at least one link with respect to a second routing metric in dependence on the value of the link in said connected graph according to said first routing metric in relation to the value of the reference route according to said first routing metric; and
      determine at least part of a route between said source node and said destination node in said modified connected graph, based on the modified link cost, according to said second routing metric, and
   wherein selectively modifying the link cost of the at least one link with respect to said second routing metric comprises modifying, at least in a given interval, the link cost as a smooth continuous function of the value of the at least one link according to said first routing metric in relation to the value of the reference route according to said first routing metric.

13. The device of claim 12, wherein the processor is further configured to execute the instructions to cause the processor to:
   determine the reference route between said source node and said destination node in said connected graph according to said first routing metric; and
   establish the value of the determined reference route with respect to said first routing metric.

14. The device of claim 12, wherein said processor is further configured to receive the value of the reference route according to said first routing metric from a network node.

15. The device of claim 12, wherein said processor is further configured to obtain a value of a reference route that is selected among optimal routes according to said first routing metric.

16. The device of claim 12, wherein said processor is further configured to execute the instructions to cause the processor to determine the complete route between said source node and said destination node in said modified connected graph according to said second routing metric.

17. The device of claim 12, wherein said processor is further configured to execute the instructions to cause the processor to increase the link cost of the at least one link provided the value of the at least one link according to said first routing metric is outside a given limit relative to the value of the reference route according to said first routing metric.

18. The device of claim 12, wherein said processor is further configured to execute the instructions to cause the processor to remove each link that is outside a given limit relative to the value of the reference route according to said first routing metric to provide a trimmed connected graph.

19. The device of claim 12, wherein said first routing metric is based on bit rate or throughput.

20. The device of claim 12, wherein said second routing metric is based on power consumption or latency of the route.

21. A network node comprising a device configured to:
obtain a value of a reference route between a source node and a destination node in said connected graph according to a first routing metric;
evaluate a value of a link in said connected graph according to said first routing metric in relation to the value of the reference route according to said first routing metric; and
selectively modify, at least in a given interval, a link cost of at least one link with respect to a second routing metric in dependence on the value of the link in said connected graph according to said first routing metric in relation to the value of the reference route according to said first routing metric; and
determining at least part of a route between said source node and said destination node in said modified connected graph, based on the modified link cost, according to said second routing metric, and
wherein selectively modifying the link cost of the at least one link with respect to said second routing metric comprises modifying, at least in a given interval, the link cost as a smooth continuous function of the value of the at least one link according to said first routing metric in relation to the value of the reference route according to said first routing metric.

22. The network node of claim 21, wherein said network node is one of the nodes in the multi-hop network operating according to a distributed routing mechanism.

23. A computer program stored on a non-transitory computer readable medium, the computer program comprising instructions which, when executed by a computer processor, cause the computer processor to perform instructions, the instructions comprising:
obtain a value of a reference route between a source node and a destination node in said connected graph according to a first routing metric;
evaluate a value of a link in said connected graph according to said first routing metric in relation to the value of the reference route according to said first routing metric; and
selectively modify, at least in a given interval, a link cost of at least one link with respect to a second routing metric in dependence on the value of the link in said connected graph according to said first routing metric in relation to the value of the reference route according to said first routing metric; and
determining at least part of a route between said source node and said destination node in said modified connected graph, based on the modified link cost, according to said second routing metric, and
wherein selectively modifying the link cost of the at least one link with respect to said second routing metric comprises modifying, at least in a given interval, the link cost as a smooth continuous function of the value of the at least one link according to said first routing metric in relation to the value of the reference route according to said first routing metric.

* * * * *